Patented June 22, 1965

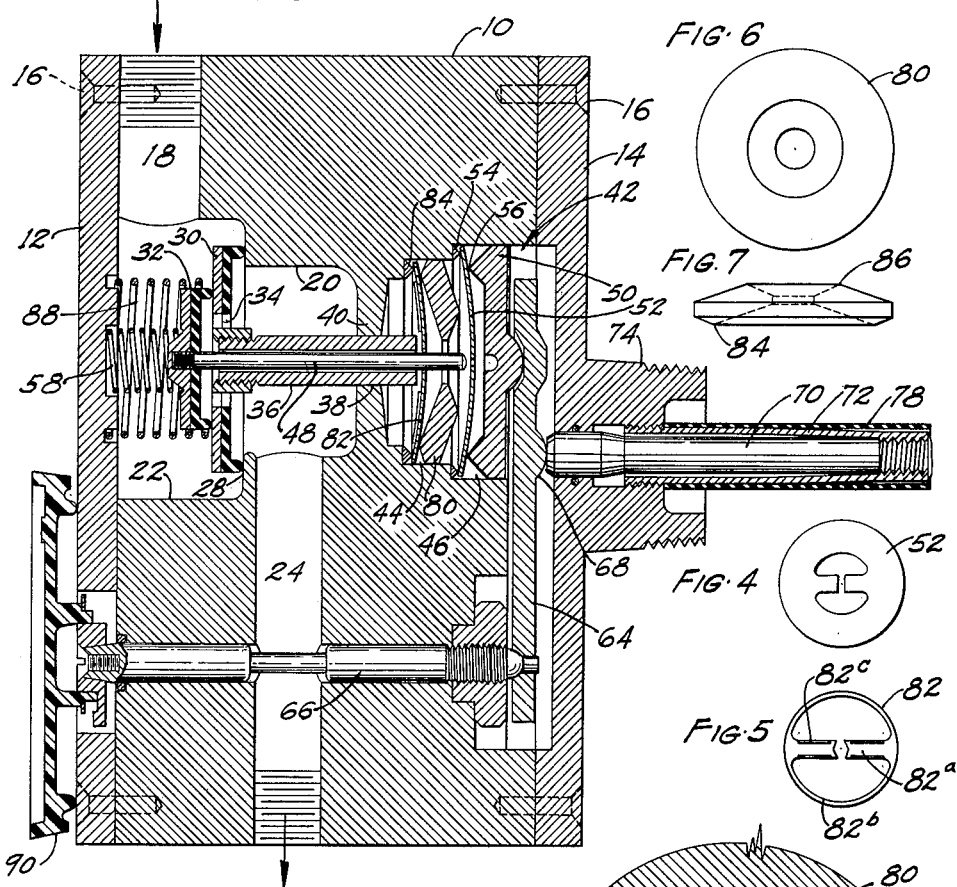

3,190,314
THERMOSTATIC GAS VALVE
Charles D. Visos, St. Louis, and Carl A. Smith, Lemay, Mo., assignors to White-Rodgers Company, St. Louis, Mo., a corporation of Missouri
Filed Apr. 30, 1962, Ser. No. 190,938
3 Claims. (Cl. 137—630.15)

This invention relates to thermostatically actuated gas valves of the type which employ a formed spring disc between the thermostatic actuator and the valve to effect snap action opening and closing of the valve, and particularly to means whereby the flow through the device is increased beyond that normally provided by the snap action opening of the valve when the temperature to which the thermostatic actuator responds continues to decrease after snap action opening of the valve occurs.

An object of the invention is to provide a thermostatically actuated gas valve of the above character wherein the thermostatic actuator continues to flex the formed spring disc element in response to further temperature change after the disc element has been snapped through a planar shape, and wherein this continued flexing of the disc element is imparted as motion, through motion multiplying means, to the valve to cause the further opening movement thereof in a manner proportionate to such further temperature change.

A further object is to provide a device of this character wherein two valve elements are employed, one of which is caused to open with a snap action as the formed spring disc snaps through a planar shape, thereby to provide flow through the device which will support normal burner operation, and the other of which is caused to open by the further flexing of the formed disc element in the same direction, thereby to increase the flow through the device in a manner proportionate to temperature change.

These and further objects and advantages will be apparent from the following description when read in connection with the accompanying drawing.

In the drawing:
FIG. 1 is a cross-sectional view of a thermostatically actuated valve constructed in accordance with the present invention;
FIG. 2 is a fragmentary cross-sectional view showing an operative position of the device wherein the smaller valve of a pair of cascaded disc or poppet valves is in open position and the larger of the pair in closed position;
FIG. 3 is a fragmentary cross-sectional view showing a second operative position of the device wherein the larger valve is in open position;
FIG. 4 is a detailed view of the formed snap action disc element;
FIG. 5 is a detail view of the flexible motion multiplication disc element; and
FIGS. 6 and 7 are detail views of the rigid motion multiplication disc element.

The device is particularly adapted to control the flow of gas to the gas burner of a hot water heater according to requirements to maintain a preselected water temperature and to recover this temperature quickly when a large draw-off of water occurs. It will be apparent, however, that the device with slight modification may be readily adapted to other uses.

Referring to the drawing in more detail, numeral 10 indicates a valve body having a front plate 12 and a rear plate 14. Plates 12 and 14 are attached to body member 10 by screws 16. The body is provided with an inlet passage 18, a valve chamber comprising a bore 20 and counterbore 22, and an outlet pasage 24. The bore 20 and counterbore 22 forming the valve chamber extend inwardly from the front face of the valve body and, respectively, intersect the outlet and inelt passages 24 and 18. A flat annular valve seat 28 is formed at the bottom of counterbore 22 which is engaged by the larger diameter valve 30 of a pair of cascaded disc valves, the smaller of which 32 seats on the outer face of the larger valve and when so seated covers perforations 34 in larger valve 30 arranged about its center.

The larger valve 30 is provided with a hollow stem 36 which is guided in a bore 38 in a body partition 40 and extends through the partition into a chamber generally indicated at 42. Chamber 42 is formed by a bore 44 and a counterbore 46 entering from the rear side of the body in axial alignment with bore 20 and counterbore 22. The smaller valve 32 is provided with a solid stem 48 which passes through the hollow stem 36 of valve 30 and extends somewhat beyond the end thereof into the counterbore portion 46 of chamber 42, the hollow stem portion 36 extending only into the bore portion 44.

Slidably mounted in the countrebore portion 46 of chamber 42 is a relatively thick rigid disc member 50. Between disc 50 and the shoulder formed by the counterboring of bore 44 is a relatively thin disc 52 having meniscus form and arranged with its convex surface facing outward. The disc 52 is poised between a fixed annular knife-edge member 54 engaging the disc very near its edge on one side thereof and an annular knife-edge 56 formed on the inner surface of member 50 engaging the disc on its other side slightly inward from the point of engagement of knife edge member 54, so that only a slight inward movement of member 50 is required to cause disc 52 to snap through a planar shape to an opposite meniscus form. The solid stem 48 of small valve 32 extends to a point adjacent the snap disc 52 and is engaged thereby as disc 52 snaps through a planar shape resulting in the opening of valve 32 against its closing spring 58. This operative position of the device is shown in FIG. 2.

The outer face of disc 50 is provided with a hemispherical boss 60 engaged in an accommodating recess 62 at the free end of a lever 64, the lever 64 being pivoted at its other end on the ball end of a threadedly adjustable rod 66. Lever 64 is further provided with an intermediate hemispherical boss 68 formed on its outer surface which is engaged by the inner end of an actuating rod 70. The rod 70 and the surrounding sleeve 72, which are connected at their outer ends, constitute a conventional rod and tube type temperature responsive actuator which is threadedly engaged at its inner end by threaded engagement of the inner end of tube 72 in an internally and externally threaded boss 74 formed on the rear face of rear cover plate 14. The rod and tube are adapted to extend into a hot water tank when the entire device is attached to a hot water tank by threaded engagement of boss 74 into a suitably perforated and internally threaded boss on a water tank. The rod 70 is constructed of low expansion metal and the surrounding sleeve 72 is constructed of high expansion metal such as copper. The sleeve 78 surrounding copper sleeve 72 is of pliant synthetic plastic material and protects the sleeve from corrosive elements in the water. As the water temperature surrounding rod and tube 70 and 72 decreases, sleeve 72 contracts at a considerably higher rate than rod 70 and therefore rod 70 moves inward to impart movement to disc 50 through lever 64 and effect the snap action movement of disc 52 which results in the opening of smaller valve 32.

Slidably mounted within the bore 44 is a relatively thick, rigid disc member 80. Between disc 80 and the bottom of bore 44 is a relatively thin, flexible disc member 82 of meniscus form arranged with its convex surface facing outward. The disc 82 is poised between a fixed annular knife-edge member 84 resting on the bottom of bore 44 and engaging the disc very near its outer edge on one side and an annular knife-edge 86 formed on the inner surface of member 80 engaging the disc on its other side slightly inward from the point of engagement of knife-edge 84, so that only a slight inward movement of member 80 is required to cause disc 82 to be moved through a planar shape to an opposite meniscus form as shown in FIG. 3.

The outer surface of member 80 is also provided with an annular knife-edge 86 of considerably smaller diameter than the annular edge formed on its other side, which smaller diameter edge is engaged by the inner surface of snap disc 52 when the latter is snapped through a planar shape as shown in FIG. 2. The engagement of member 80 by the snap disc 52 when it snaps through a planar shape does not, however, cause any operative movement of member 80 because, at this point, the spring rate of the disc 52 has diminished considerably and, more particularly, because the disc 82 which the member 80 bears against in turn bears at its inner surface against the end of hollow valve stem 36 which is opposed by the larger valve closing spring 88. A further decrease in the temperature of the water surrounding rod and tube 70 and 72 after the disc 52 has been snapped through a planar shape causes a further flexing of disc 52, the inward movement of member 80, and the flexing of disc member 82, which due to its engagement with the end of hollow valve stem 36 causes the larger valve 30 to move openward. When the water temperature drop is sufficient, the elements will assume the position substantially as shown in FIG. 3, with the larger valve 30 open.

It is to be understood that while disc 52 imparts a snap action movement to the stem 48 of the smaller valve 32 as it passes through a planar shape, the action of flexible disc member 82 in passing through a planar shape is not a snap action movement and the motion applied therethrough to the end of the hollow valve stem 36 of the larger valve is gradual and proportionate to temperature change. Referring to the detail view of disc member 82 in FIG. 5, it will be seen that a considerable portion of the disc is cut away so that what remains is actually a disc-like member having two opposed radial arms 82a joined by a thin, narrow band 82b. Moreover, the metal from which member 82 is stamped is relatively thin so that the function of the band 82b is merely that of holding arm 82a in their relative positions and not to store energy to provide a snap action. The arms 82a are stiffened by right angularly formed ribs 82c.

Due to the multiplication by element 80 and arms 82a of disc 82 of that further flexing of snap disc 52 which succeeds the opening of smaller valve 32, the hollow stem 36 of the larger valve will now be moved at a considerably greater rate than the solid stem 48 of the smaller valve, so that as the larger valve moves openward, the amount of opening of the smaller valve with relation to its seat on the larger valve diminishes, as shown in FIG. 3. The total area of the perforations 34 in large valve 30 and the difference in diameter of the large and small valves is such, however, that even though the smaller valve partially closes the flow through the device increases considerably as the larger valve moves openward in response to further decrease in water temperature.

When the water temperature rises from a point which effects the opening of larger valve 30 as the result of burner operation, the action of rod 70 of the rod and tube device 70–72 will be to move outward from lever 64, and the progress of valve closing under the bias of valve springs 58 and 88 is substantially as follows: springs 88 and 58 gradually urge the valves 32 and 30, their stems 36 and 48, the disc 82, rigid disc 86, snap disc 52, and rigid disc 50 back to their positions, as indicated in FIG. 2. At this point the larger valve return spring 88 is no longer in effect, the large valve being closed. Further increase in water temperature at this point permits the smaller valve return spring 58, through valve stem 48, to move rigid disc 80 outward and snap disc 52 to a position wherein the snap disc 52 again snaps through a planar shape to its outwardly convex form as shown in FIG. 1, thereby permitting smaller valve 32 to close with a snap action under the urging of return spring 58.

When the drop-in water temperature below that selected to be maintained is relatively small, only the smaller valve 32 will open with a snap action and the burner will operate at a normal output rate to restore the selected temperature, whereupon the smaller valve will again close with a snap action. When the drop-in water temperature below the preselected temperature is relatively great, the smaller valve 32 will open first with a snap action, followed by the gradual opening of the larger valve 30, and the burner will be operated at a higher than normal output rate, and the increase in output of the burner will be proportional to the temperature drop within the range of the device.

The threadedly adjustable rod 66 which at one end forms a pivot for lever 64 extends exteriorly of the casing at its other end and is provided with an adjustment knob 90. Turning knob 90 in a direction to move the rod 66 toward the right with reference to FIG. 1 effects the opening of valves 30 and 32 at higher water temperatures.

The foregoing description is intended to be illustrative and not limiting, the scope of the invention being set forth in the appended claims.

We claim:
1. In a thermostatic valve, a body member having a passage therethrough, a first normally closed perforated disc valve controlling said passage, a second normally closed disc valve seating on said first valve and closing the perforations therein, a hollow stem on said first valve, a stem on said second valve extending through said hollow stem and projecting beyond the end thereof, a thermostatic actuator, a snap disc between said actuator and said valve arranged to abut said second valve stem and impart a snap action valve opening motion thereto as it is moved from one position to another by said actuator as it responds to decreasing temperature, said snap disc being capable of being flexed beyond said other position by said actuator as it responds to further decreasing temperature, and motion multiplying means between said disc and said first valve stem and spaced from said disc when in its said one position and engaged by said snap disc only when in its said other position.

2. In a thermostatic valve, a valve body, first and second valves controlling the flow therethrough, said first valve controlling a small port and said second valve controlling a large port, operating members on said valves, a thermostatic actuator, a snap disc operatively connected to said actuator and operative to directly engage said first valve operating member and impart a snap action valve opening movement thereto when snapped from one position to another through dead center by said actuator as it responds to decreasing temperature, and said disc being capable of being flexed beyond said other position by said actuator as it responds to further decreasing temperature, and motion multiplying means between said disc and said second valve operating member, said motion multiplying means being spaced from said disc when said disc is in its said one position and engaged by said disc only when said disc is in its said other position and said motion multiplying means forming an operative connection between said disc and said second valve operating member when said disc is in its said other position, thereby to impart a gradual opening movement to said second valve as said disc is flexed beyond said other position.

3. In a thermostatic valve, a valve body, first and second valves controlling the flow therethrough, an operating stem for each of said valves, a thermostatic actuator, a snap disc operatively connected to said actuator and operative to engage said first valve stem and impart a snap action valve opening movement thereto when snapped from one position to the other through dead center by said actuator as it responds to temperature change, and said disc being capable of being flexed beyond its said other position by said actuator as it continues to respond to further temperature change, motion multiplying means between said disc and said second valve stem, said motion multiplying means being spaced from said disc to permit its free rapid movement from its said one to its said other position, and said motion multiplying means being engaged by said disc when said disc is in its said other position and forming an operative connection between said second valve stem and said disc when said disc is in its said other position whereby opening movement is imparted to said second valve when said disc is flexed beyond its said other position.

References Cited by the Examiner
UNITED STATES PATENTS

| | | | |
|---|---|---|---|
| 1,919,265 | 7/33 | Vaughn | 236—1 |
| 2,991,012 | 7/61 | Wright. | |
| 3,052,264 | 9/62 | Graham | 251—75 XR |

WILLIAM F. O'DEA, *Primary Examiner.*